Patented Dec. 8, 1925.

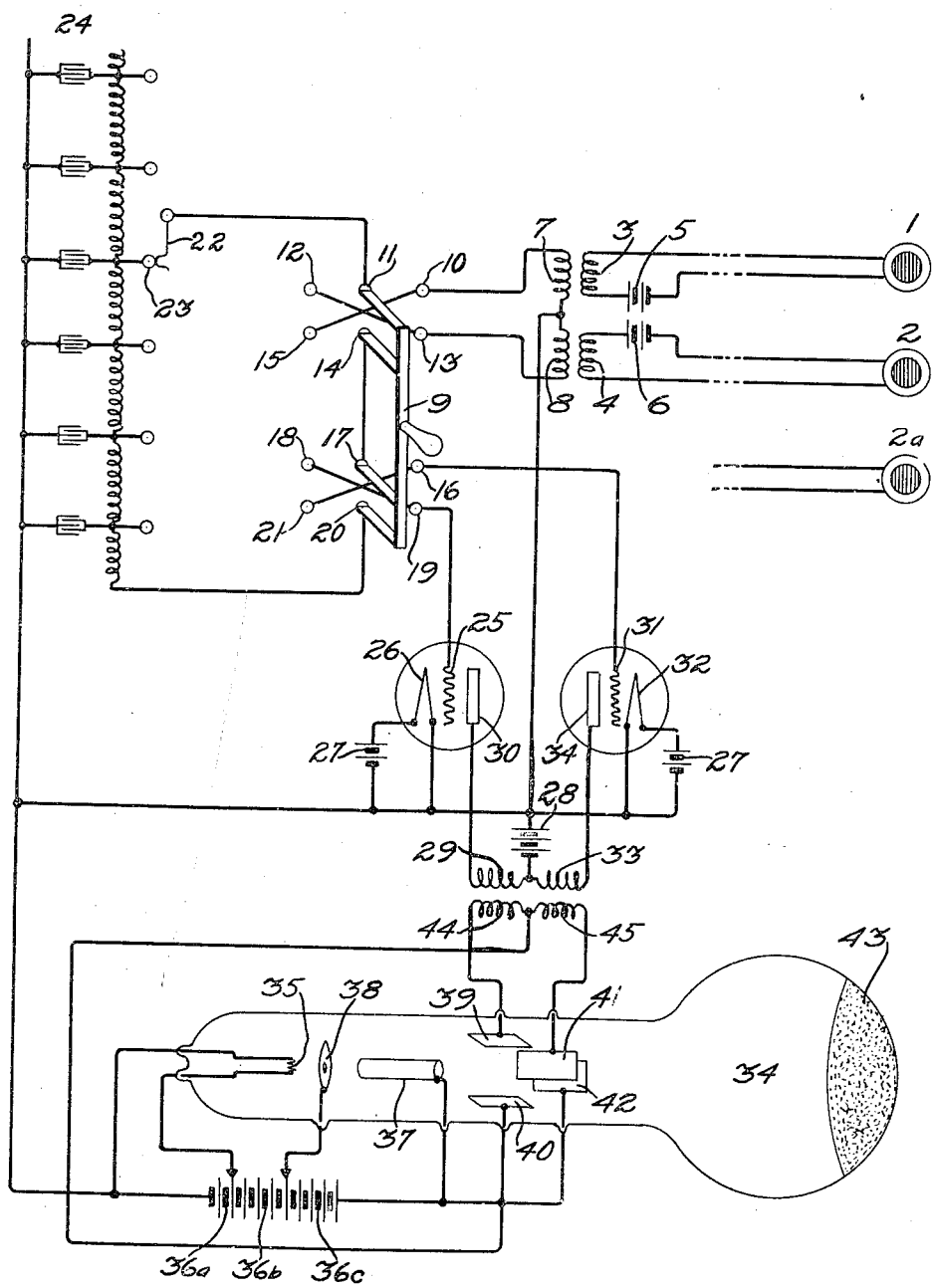

1,564,303

UNITED STATES PATENT OFFICE.

PETER IRVING WOLD, OF SCHENECTADY, NEW YORK, ASSIGNOR TO WESTERN ELECTRIC COMPANY, INCORPORATED, OF NEW YORK, N. Y., A CORPORATION OF NEW YORK.

SYSTEM FOR LOCATION OF A SOURCE OF WAVE ENERGY.

Application filed April 18, 1921. Serial No. 462,076.

*To all whom it may concern:*

Be it known that I, PETER I. WOLD, a citizen of the United States, residing at Schenectady, in the county of Schenectady, State of New York, have invented certain new and useful Improvements in Systems for Location of a Source of Wave Energy, of which the following is a full, clear, concise, and exact description.

This invention relates to the combination of apparatus and circuits and method of their use for location of a source of wave energy, and particularly to the use of a Braun cathode ray tube as the indicator of completed adjustment in the determination.

An object of this invention is to provide visual means for indicating completed adjustment of a compensator in a system for the location of a source of wave energy.

Heretofore, it has been customary in wave energy location as applied to sound to employ a plurality of transmitters, used in pairs, sending their impulses through intervening apparatus consisting of switching mechanism, phase compensating means, and if necessary, amplifying circuits to two receivers. Since it seldom occurs that a source of sound is located equidistant from both transmitters, introduction of compensation into one line is used to cause an alteration in phase of transmitted impulses relative to impulses in the other line. Proper compensation to produce synchronism of the two trains of transmitted impulses is indicated by the simultaneous arrival of the sound in both receivers, which can be recognized by the binaural sense of the observer. The compensation is so arranged or calibrated as to indicate the direction of the source of sound. This method is commonly known as the binaural method of sound detection. In using this method it is sometimes difficult to obtain an accurate synchronism in the transmitted impulses, thus leaving a certain field of sound location wherein the position for exact compensation must be estimated.

This invention provides a visual means for determining with great accuracy the point of synchronism of transmitted and compensated electrical impulses produced by sound waves, and at the same time leaves the operator's ears free for conversation.

To obtain the visual effect by use of a Braun tube, two pairs of cathode ray modulating plates are used at an angle to each other, each pair arranged with plates opposite each other so as to form an electrostatic field across the path of said cathode ray. Comparing this visual effect with the binaural method of sound location, each pair of the aforesaid plates replaces one of the pair of receivers used in the binaural method. In operation of the visual method proposed in this invention, the incoming wave is, of course, a complex wave and therefore, if the plates in one plane alone are excited, the motion of the spot of light will be complex with respect to time but will still be shown as a straight narrow line. If the plates in the plane at an angle are excited there will be a similar complex motion of this spot of light in a straight line, but at an angle to the first. If all sets of plates are excited, each with its own wave, the waves being identical but in general differing in phase because of difference in time of arrival, the motion of the spot of light will be exceedingly complex, and will take on the appearance of a large splotch of light. As compensation is introduced into one or more paths, and the waves are gradually brought into phase, the spot of light will gradually take on an elliptical form and at the time of exact compensation will reduce to a narrow straight line. If the excitation on any two sets of plates is the same this line will, of course, make an angle with each of the sets of plates equal to one half the angle between adjacent plate planes. However, the angle is of no importance in this connection, but only the fineness of the line of light formed, it being finest for the compensation adjustment giving synchronism in the transmitted current impulses. Because of the great complexity of incoming sound waves and therefore the complexity of transmitted current impulses, the region of phase compensation over which a narrow straight line of light is obtained is small and the point of full compensation or exact synchronism of transmitted impulses is therefore determinable with great accuracy.

This invention provides in combination a plurality of sound sensitive devices, adjustable means for compensating the phase difference in arrival of sound at the various sound sensitive devices, visual electrical means for the determination of proper adjustment of said phase compensating means and means for converting said sounds into electrical impulses.

One embodiment of this invention, where sound vibrations are converted into corresponding electrical impulses immediately on detection by the sound sensitive devices, is disclosed in the illustrative drawing, in which case electrical phase compensation is employed. However, the detected sound vibrations may be compensated by other means and then electrically converted, without departing from the scope and spirit of the invention.

Referring to the illustrative drawing, there are disclosed a plurality of telephonic transmitters 1, 2 and 2$^a$ and sensitive to sound vibrations from an unlocated source, the pair used in the drawing being 1 and 2 connected in separate circuits, each with a primary winding 3 and 4 of separate induction coils and a separate battery 5 and 6 in series respectively. The secondary windings of these induction coils 7 and 8 lead to the input terminals of two thermionic amplifiers. These amplifiers consist of the well known filament, grid and plate structure enclosed in a vacuum chamber and supplied with electrical source of filament heating energy and filament-plate potential, the input terminals being the filament and grid and the output terminals, the filament and plate. A 4-pole double throw switch 9, or its equivalent, is arranged to put an adjustable electrical compensator 24, consisting of series inductance and shunt capacity, in series in either secondary circuit 7 or 8 and leave the other secondary circuit without alteration, dependent on whether the switch is thrown to the right or left. Thus, if switch 9 is thrown to the right, current impulses may be traced from secondary winding 7 to contact point 10, through a switch bar to contact point 11, thence through adjustable contact point 22 to fixed contact point 23 on the electrical compensator 24, through the portion of this compensator in circuit to contact point 20, through a switch bar and contact point 19 to the grid 25 of the left-hand thermionic amplifier, thence within the tube to filament 26 and back to secondary winding 7. Filament 26 is heated by battery 27 and the filament-plate potential is supplied by battery 28 through induction coil primary 29 to plate 30.

In a somewhat similar manner, with switch 9 still thrown to the right, a path for current impulses may be traced from secondary winding 8 through contact point 13, a switch bar, contact points 14 and 17, another switch bar, contact point 16, to grid 31 of the right-hand thermionic amplifier, thence within the tube to filament 32 and back to secondary winding 8 by the same return wire as above mentioned for secondary winding 7. The filament 32 is heated by battery 27, which may be common for both amplifiers but is shown here as two separate batteries for clearness, and filament-plate potential is applied by the before mentioned battery 28 through induction coil primary winding 33 to plate 34. It will be noted in this case that the current impulses pass directly to the amplifier input terminals without the introduction of compensation.

Throwing the switch 9 to the left so that its switch bars engage with contact points 12, 15, 18 and 21 merely reverses the conditions concerning the introduction of adjustable compensation into the input circuit to the amplifiers. The input circuit needing compensation is determined by the location of the source of sound relative to a line connecting points equidistant from both transmitters in use and to determine which circuit needs compensation the switch may be thrown arbitrarily in either direction and a rough trial compensation adjustment made. If complete compensation cannot be effected, a wrong guess is indicated and the switch should be reversed, whereupon accurate compensation will be possible.

The Braun cathode ray tube disclosed in the lower portion of the illustrative drawing and used for visually indicating proper adjustment of the before mentioned electrical compensator 24 comprises a glass bulb or enclosure 34 properly evacuated, a cathode filament 35 heated by battery 36$^a$, a cylindrical anode 37, a ray shield or diaphragm 38 with a small perforation for limiting the diameter of cathode beam produced, said diaphragm 38 being placed intermediate said filament 35 and anode 37, an electrical potential for producing said cathode beam maintained between said cathode and anode by battery 36$^{bc}$ and proper potential connected between said cathode 35 and diaphragm by battery 36$^b$ for governing the quality of said cathode beam; also two pairs of plates 39, 40, and 41, 42, for producing two electrostatic fields at right angles to each other in the path of said cathode beam which passes therethrough and impinges on the fluorescent end 43 of the bulb. The operation of this cathode ray tube as a visual indicator of complete electrical synchronism of transmitted current impulses is effected by electromagnetically associating each pair of said electrostatic field plates respectively with the output terminals of the before mentioned amplifiers by means of induction coil secondary windings 44 and 45. Thus a circuit may be traced from secondary winding 44 to plate 39, thence electrostatically across the cathode beam, through plate 40 and back to secondary 44. In a similar manner a circuit may be traced from secondary 45 to plate 41, thence electrostatically across the cathode beam at right angles to the electrostatic field of plates 39 and 40, through plate 42 and back to secondary winding 45 by the same return wire as used in the left hand circuit.

Thus, in this invention, any electrical impulses set up in the transmitter circuits by sound vibrations are electromagnetically communicated to the input of amplifiers, directly in the one circuit and through phase compensation in the other circuit, emerge amplified in strength from said amplifiers, are electromagnetically communicated respectively to two right angular pairs of electrostatic field plates in a cathode ray tube having a cathode beam impinging on a screen of fluorescent material, the electrostatic fields established acting on the cathode beam passing therethrough to deflect it in accord with the strength and polarity of the transmitted current impulses. Whenever the transmitted current impulses in the two circuits exactly coincide both in time and strength, both electrostatic fields will act on said cathode beam equally and the rsulting visual effect will be a narrow line of light at an equal angle to both electrostatic plate planes. If said impulses coincide in time but not in amplitude the visual effect will be still a narrow line of light but not at the same angle to the plate planes as above mentioned.

The proper coupling of the cathode ray tube with the compensated electrical impulses produced in the transmitter circuits by sound vibrations may be accomplished in a variety of ways, only one of which is shown in the illustrative drawing and it is to be expressly understood that the circuits disclosed are used merely to facilitate description of the invention as a whole and not to define the limits thereof, reference being directed to the appended claims for this purpose.

What is claimed is:

1. In a system of the character described, a plurality of impulse transmitters, and means including a cathode ray tube for visually indicating the relative intensities of the impulses transmitted thereby.

2. A system for locating a source of wave energy comprising a pair of electrically conducting paths, means responsive to incoming waves to set up electrical impulses in said conducting paths, means for synchronizing the electrical impulses set up in said paths, and means for giving a visual indication of the phase coincidence resulting from synchronizing the electrical impulses.

3. In a system for the location of a source of sound vibrations, the combination of a plurality of means for the conversion of sound vibrations into electrical impulses, adjustable phase compensating means for said electrical impulses, and visual indicating means of the proper adjustment of said compensating means.

4. In a system for the location of a source of sound vibrations, the combination of a plurality of means for the conversion of sound vibrations into electrical impulses, adjustable phase compensating means for synchronizing said electrical impulses, and a visual electronic indicator of the proper adjustment of said compensating means.

5. In a system for the location of a source of sound vibrations, the combination of a plurality of means for the conversion of sound vibrations into electrical impulses, adjustable phase compensating means for synchronizing said electrical impulses, means for amplifying said electrical impulses, and a visual electronic indicator of the proper adjustment of said compensating means.

6. In a system for the location of a source of sound vibrations, the combination of a plurality of devices for the conversion of sound vibrations into electrical impulses, adjustable phase compensating means for synchronizing said electrical impulses, a cathode ray tube having a plurality of pairs of electrostatic field plates disposed at right angles to the light beam in said cathode ray tube, each of said pairs being associated with one of said devices respectively, and a source of electrical energy for operating said cathode ray tube.

7. In a system for the location of a source of sound vibrations, the combination of a plurality of telephonic devices for the conversion of sound vibrations into electrical impulses, adjustable phase compensating means for synchronizing said electrical impulses, said compensating means being a function of the direction of the source of sound vibrations, a plurality of thermionic means for amplifying said electrical impulses, a cathode ray tube having a plurality of pairs of electrostatic field plates each pair being associated with the output of one of said amplifying means respectively, said pairs of electrostatic field plates being disposed at right angles of one another and at right angles to the cathode ray, and a source of electrical energy for operating said cathode ray tube.

8. In a system for the location of a source of sound vibrations, the combination of a plurality of telephonic means for converting sound vibrations into electrical impulses, electrical phase compensating means comprising a combination of series inductance and shunt capacity for synchronizing said electrical impulses, a plurality of thermionic amplifiers associated respectively with the electrical output of each of said telephonic sound converting means, a cathode ray tube having a plurality of pairs of electrostatic field plates each pair associated with the output of one of said amplifiers respectively and arranged at right angles to one another and to the cathode ray, and a source of electrical energy for operating said cathode ray tube.

9. In a system for locating a source of sound, the combination of a pair of telephonic transmitters, a pair of thermionic amplifiers each of which is connected to the output of one of said transmitters, adjustable phase compensating means for synchronizing the electrical impulses generated by said transmitters, a cathode ray tube having two pairs of electrostatic field plates disposed at right angles to each other and to the cathode ray and coupled respectively to the output circuits of said amplifiers, and sources of electrical energy for said transmitters, amplifiers and cathode ray tube.

10. A system for locating a source of wave energy comprising a plurality of wave responsive devices, means to induce electrical impulses in electrically separate conducting paths, a phase compensating means, means for connecting said phase compensating means with either of said conducting paths, means for amplifying the electrical impulses in said conducting paths, means for visually indicating the phase relation of electrical impulses in said conducting paths, and means for supplying electrical energy for said system.

In witness whereof, I hereunto subscribe my name this 14 day of April A. D., 1921.

PETER IRVING WOLD.